(12) United States Patent
Miller et al.

(10) Patent No.: US 8,907,604 B2
(45) Date of Patent: Dec. 9, 2014

(54) PWM FREQUENCY PATTERN OPTIMIZATION FOR NVH

(75) Inventors: Jami J. Miller, Canton, MI (US);
Michael W. Degner, Novi, MI (US);
Scott Xiong Yu, Canton, MI (US);
William C. Reynolds, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 13/367,675

(22) Filed: Feb. 7, 2012

(65) Prior Publication Data

US 2013/0200828 A1    Aug. 8, 2013

(51) Int. Cl.
*H02K 29/06*    (2006.01)

(52) U.S. Cl.
USPC ............ 318/400.23; 318/400.24; 318/400.25; 318/599; 363/41; 363/45; 363/21.1; 375/254; 375/346; 327/551; 327/310

(58) Field of Classification Search
CPC .......... H03K 7/08; H03K 5/08; H03K 3/284; H03K 5/04; H03K 5/1565; H03K 5/13; H03K 5/1252; H04L 25/4902; H04L 25/03343; H04L 25/4927; H04L 25/4975; H04L 7/043; H04L 7/042; H03F 3/217; H03F 2200/351; H03F 1/36; G06F 1/025; H03M 13/25; H03M 5/08; H03M 1/00; H03M 2201/418; H03M 2201/4233; H03M 2201/4262; H04B 14/04; H04B 1/7085; H04B 1/707; H04B 1/7075; H04B 2001/7154; H04B 1/7143; H04B 1/715; H02M 1/44; H02M 1/12; H02M 2001/123; H02P 6/10; H02P 6/16; H02P 7/29; H02P 6/085; H02P 6/142; H02P 6/14; H02P 6/182; H02P 2209/07; H02P 6/06; H02P 6/08; G05B 11/28; G05B 2219/42237; G05D 3/18; G04C 3/065; G04C 3/06; G04C 3/066; G04C 3/10; H02K 33/00; H02K 29/00; H03C 3/08; H03C 3/00; H03C 3/14; H03C 3/06; H03C 1/06; H03C 1/60; H03C 1/20; H03C 1/36; H03G 11/06; H03G 11/004; H01L 27/0266
USPC ........ 318/599, 400.24, 400.25, 128; 375/254, 375/278, 367, 346, 377; 363/41, 21.1; 327/540
See application file for complete search history.

(56) References Cited

U.S. PATENT DOCUMENTS 5,933,453 A * 8/1999 Lewison ...................... 375/238
6,972,534 B1 * 12/2005 Schulz et al. ............. 318/400.02
7,245,094 B2    7/2007 Shinmura et al.

(Continued)

*Primary Examiner* — Kawing Chan
*Assistant Examiner* — Jorge L Carrasquillo
(74) *Attorney, Agent, or Firm* — Maristyn Law LLC

(57) ABSTRACT

An optimized pseudo-random period pattern can reduce audible noise in a system that includes an inverter circuit configured to provide power to an electric machine. A system can include a PWM optimization module (POM) comprising the PPP. A carrier period for a carrier signal used to provide PWM inverter drive signals can be selected in accordance with the PPP. The PPP can be expressed as an array of 200-400 elements, each element a period belonging to a finite set of 2 or more predetermined periods. A period can be selected by index from the array, and the index incremented to progress through the PPP, which can be repeated upon its completion. The PPP can be optimized to reduce audible noise while mitigating inverter losses. Modeling techniques can determine the number of array elements, the number of possible periods, and the period values that optimize the PPP.

13 Claims, 6 Drawing Sheets

(56) References Cited

U.S. PATENT DOCUMENTS

| | | |
|---|---|---|
| 7,443,116 B2 | 10/2008 | Kutsuna et al. |
| 8,633,779 B2 * | 1/2014 | Pfaffinger ................ 332/109 |
| 2003/0108098 A1 * | 6/2003 | Geddes .................... 375/238 |
| 2003/0174005 A1 * | 9/2003 | Latham et al. ............ 327/172 |
| 2007/0290894 A1 * | 12/2007 | Ng et al. .................... 341/50 |
| 2009/0115362 A1 | 5/2009 | Saha et al. |
| 2010/0052583 A1 | 3/2010 | Takamatsu et al. |
| 2010/0263895 A1 * | 10/2010 | Bosch ...................... 173/217 |

* cited by examiner

PWM FREQUENCY PATTERN OPTIMIZATION FOR NVH

BACKGROUND OF INVENTION

1. Field of Invention

This invention relates generally to power electronic inverter systems, and more particularly to methods and apparatus to reduce noise, vibration and harshness (NVH) associated with an electric machine for a vehicle.

2. Background Art

Electric and hybrid electric vehicles can employ electrical energy for propulsion via an electric drive system that can include a power circuit, such as a power electronics inverter, coupled to an electric machine. In this arrangement, the power circuit can control the transfer of power between a power source and the electric machine to drive a load, such as the vehicle transaxle. For a three-phase, AC electric machine, the power circuit can include an inverter with three phase legs, each leg comprising switches that can be individually controlled to provide a desired inverter output. As an example, drive signals that are a function of an electric machine's torque requirement can be provided to the inverter by an inverter control.

Pulse width modulation (PWM) signals are often used as drive signals for an inverter. The desired fundamental voltage commands can be modulated by a carrier signal to produce a series of pulses that turn inverter switches on and off in order to produce the desired voltages on the coils of a multi-phase electric machine. Employing lower switching frequencies can reduce switching losses in the inverter. However, switching at frequencies within the audible spectrum can produce unpleasant high pitched whining and whistling noises that irritate automobile operators and passengers.

Efforts to reduce audible electric machine noise often rely on the use of carrier frequencies higher than the audible spectrum of the typical human ear. For example, U.S. Patent Application Publication No. US20090115362, filed by Subrata Saha et al., assigned to Aisin AW Company Limited, and published May 7, 2009, discloses a strategy to suppress side band noise by switching from a low frequency carrier (5 kHz) mode to a high frequency carrier (7.5 kHz) mode under predetermined target torque and rotational speed conditions, and switching back to the low frequency mode when other predetermined target torque and rotational speed conditions are present. While employing a carrier frequency of 7.5 kHz can move the switching frequency to the upper end of the audible range where the human ear is less sensitive, the higher switching frequency can result in higher switching losses, which can decrease fuel efficiency for an electric or hybrid electric vehicle.

U.S. Patent Publication US20100052583, filed by Naoyoshi Takaatsu et al., assigned to Toyota Jidosita, and published Mar. 4, 2010, teaches changing PWM strategy and frequency in an attempt to reduce noise and improve fuel efficiency. Takaatsu discloses a vehicle that includes a motor for driving wheels, an inverter to drive the motor, and a control device to perform PWM control of the inverter. The control device performs synchronous PWM control in a case where an electric current supplied to the motor by the inverter or torque generated in the motor is larger than a threshold value; and performs synchronous PWM control or non-synchronous PWM control in a case where the electric current or the torque is smaller than the threshold value, and sets carrier frequency or a pulse number of the PWM control to be higher in the case where the electric current or the torque is larger than the threshold value. Both synchronous and non-synchronous control circuits are required, with switching performed between the two of them. While asynchronous control can use an arbitrary frequency, synchronous control requires integer multiples of a base carrier frequency. While the Takaatsu method and system may be effective to reduce noise in some instances, it requires additional control circuitry and requires different PWM strategies for different operating conditions. For example, in some motor operating regions a strategy is implemented for noise reduction, while in a different operating region a strategy is implemented to reduce inverter losses. Both disclosures mentioned above require real-time processing to assess the current electric machine state, and designation of a PWM carrier frequency that is dependent on current and torque requirements. While perhaps adequate for their intended purposes, neither disclosure teaches a method for providing PWM control signals that can reduce electric machine noise in an optimized manner that is independent of current and torque conditions. Other solutions, such as randomization of incremental frequencies around 7.5 kHz, such as 7.75 kHz and 7.25 kHz, help mitigate switching noise, but increase switching losses and decrease fuel economy.

SUMMARY OF INVENTION

An example system includes a pulse-width modulation (PWM) optimization module (POM) configured to optimally spread PWM energy to reduce audible noise associated with an electric drive system, and an inverter circuit configured to receive a PWM drive signal comprising a carrier frequency designated by the POM. In an example system, a POM can comprise an optimized pseudorandom period pattern (PPP), and a carrier signal for PWM signaling can be generated having a period in accordance with the PPP. The PPP can be optimized to spread noise energy associated with the carrier signal in the frequency spectrum to reduce electric drive system noise audible to an automobile operator or passenger. Optimization can further include mitigation of inverter losses. In an example system, carrier period can be changed in accordance with the PPP at half-period intervals, however, it can be changed at full period, double period, and other intervals as well. Carrier frequency designation by the POM can be performed independent of electric machine current and torque requirements.

An apparatus of the invention can comprise a POM configured to optimally spread PWM energy to reduce audible electric machine switching noise. In an example embodiment, a POM can comprise a PPP optimized to reduce electric machine noise, vibration and harshness. By way of example, the PPP can comprise an array having a finite number of elements, each element representing a period belonging to a finite set of two or more predetermined periods. In an example embodiment, a PPP can comprise between 200 and 400 elements which can be selected sequentially at predetermined intervals.

A method of the invention can include selecting a carrier period by index from a PPP optimized to reduce audible electric machine noise; applying the selected carrier period, and incrementing the index. By way of example, but not limitation, the carrier period can be changed at half PWM period intervals.

DETAILED DESCRIPTION OF EXAMPLE EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not to be interpreted as limitations. For example, control modules and components for various systems can be variously arranged and/or combined, and are not to be considered limited to the example configurations presented herein. The invention will be explained in the context of a vehicle having a powertrain that includes an electric machine, however it is understood that the invention is not limited to the described environment, but has a variety of applications beyond the automobile industry.

Figure 1:
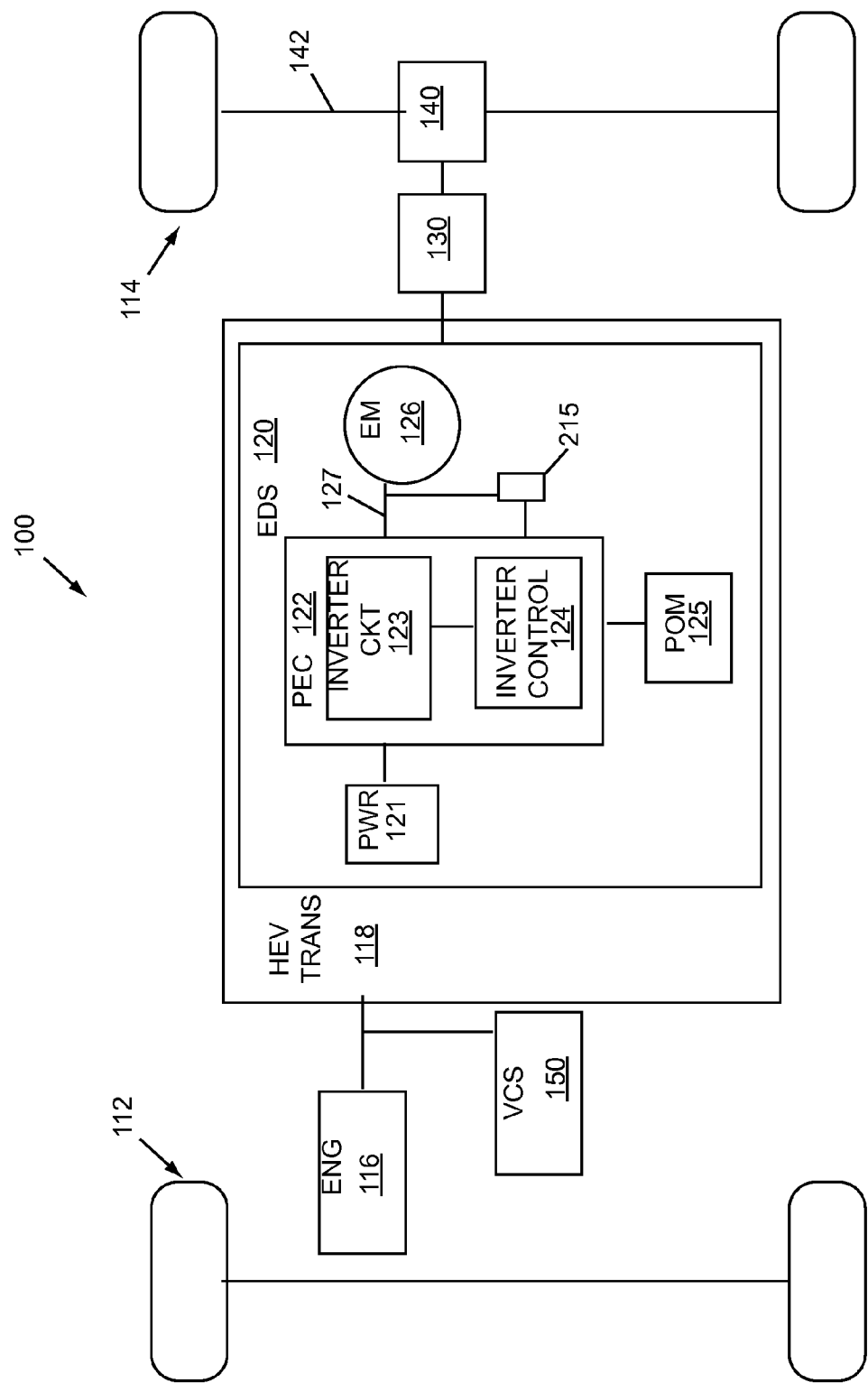
FIG. 1 shows an example system having a PWM optimization module (POM).

FIG. 1 illustrates a schematic of an example vehicle 100. The vehicle 100 may be of any suitable type, such as an electric or hybrid electric vehicle. In at least one embodiment, the vehicle 100 may include a first wheel set 112, a second wheel set 114, an engine 116, HEV transaxle 118 and an electric drive system (EDS) 120. The electric drive system 120 may be configured to provide torque to the first and/or second wheel sets 112, 114. The electric drive system 120 may have any suitable configuration; for example, it may include a power conversion circuit in the form of a power electronics converter (PEC) 122 coupled to an electric machine 126. The electric machine 126 can be coupled to a power transfer unit 130, which in turn can be coupled to a differential 140 to control the wheel set 114. It is contemplated that the electric machine 126 can function as a motor, converting electrical energy to kinetic energy, or as a generator, converting kinetic energy to electrical energy. In an example embodiment, the PEC 122 can be connected to a first electric machine via an interface cable 127, and a second electric machine via a second interface cable (not shown). The interface cable 127 can be a high-voltage three-phase interface cable by which the PEC 122 can provide power to the electric machine 126. The PEC 122 can include hardware circuitry configured to provide power to the electric machine 126, and can be coupled to a vehicle control system (VCS) 150 from which it can receive signals from various other control units regarding vehicle operation and control. The PEC 122 can be coupled to a pulse width modulation (PWM) Optimization Module (POM) 125 configured to optimize PWM drive signals for the PEC 122, so that EDS 120 audible noise can be reduced in a manner that conserves energy and protects vehicle fuel efficiency.

The electric machine 126 can be powered by one or more power sources to drive the vehicle traction wheels. The electric machine 126 may be of any suitable type, such as a traction machine, motor-generator, or starter-alternator. In addition, the electric machine 126 may be associated with a regenerative braking system for recovering energy. The power transfer unit 130 may be selectively coupled to at least one electric machine 126. The power transfer unit 130 may be of any suitable type, such as a multi-gear "step ratio" transmission, continuously variable transmission, or an electronic converterless transmission as is known by those skilled in the art. The power transfer unit 130 may be adapted to drive one or more vehicle wheels. In the embodiment shown in FIG. 1, the power transfer unit 130 is connected to a differential 140 in any suitable manner, such as with a driveshaft or other mechanical device. The differential 140 may be connected to each wheel of the second wheel set 114 by a shaft 142, such as an axle or halfshaft.

The PEC 122 can be coupled to a power source 121. In various embodiments, such as hybrid electric vehicle applications, additional power systems may be provided. For instance, a second power system may be provided that includes an electrical power source or non-electrical power source like an internal combustion engine. The power source 121 may be of any suitable type. For instance, the power source 121 can comprise an electrical power source such as a battery having a plurality of electrically interconnected cells, a capacitor, or a fuel cell. If a battery is used it may be of any suitable type, such as nickel-metal hydride (Ni-MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art. In an example embodiment, a battery can be used in conjunction with one or more capacitors.

The PEC 122 can comprise an inverter circuit 123 configured to provide power to the electric machine 126. An inverter control 124 can be configured to provide PWM drive signals to the inverter circuit 123. The inverter control 124 can be configured to perform processing and control functions associated with the operation of the inverter circuit 123, and accordingly can include hardware, software, firmware, or some combination thereof. The inverter control 123 can be configured to execute software algorithms as well as store information. In an example embodiment, the inverter control 123 can comprise a printed circuit board having the circuitry necessary to receive feedback current, receive or establish reference currents and voltages, regulate current, command voltages and currents, as well as perform other operations associated with the command and control of the electric machine 126. The inverter control 124 can receive input from a sensor 215 that detects current within the cable 127. In an example embodiment, the inverter control 124 can also receive input from a sensor (not shown) configured to detect electric machine 126 motion. A POM 125 can be coupled to the inverter control 124 to optimize PWM signaling to reduce audible noise associated with the electric machine 126 operation while avoiding power losses at the inverter circuit 123.

Figure 2:
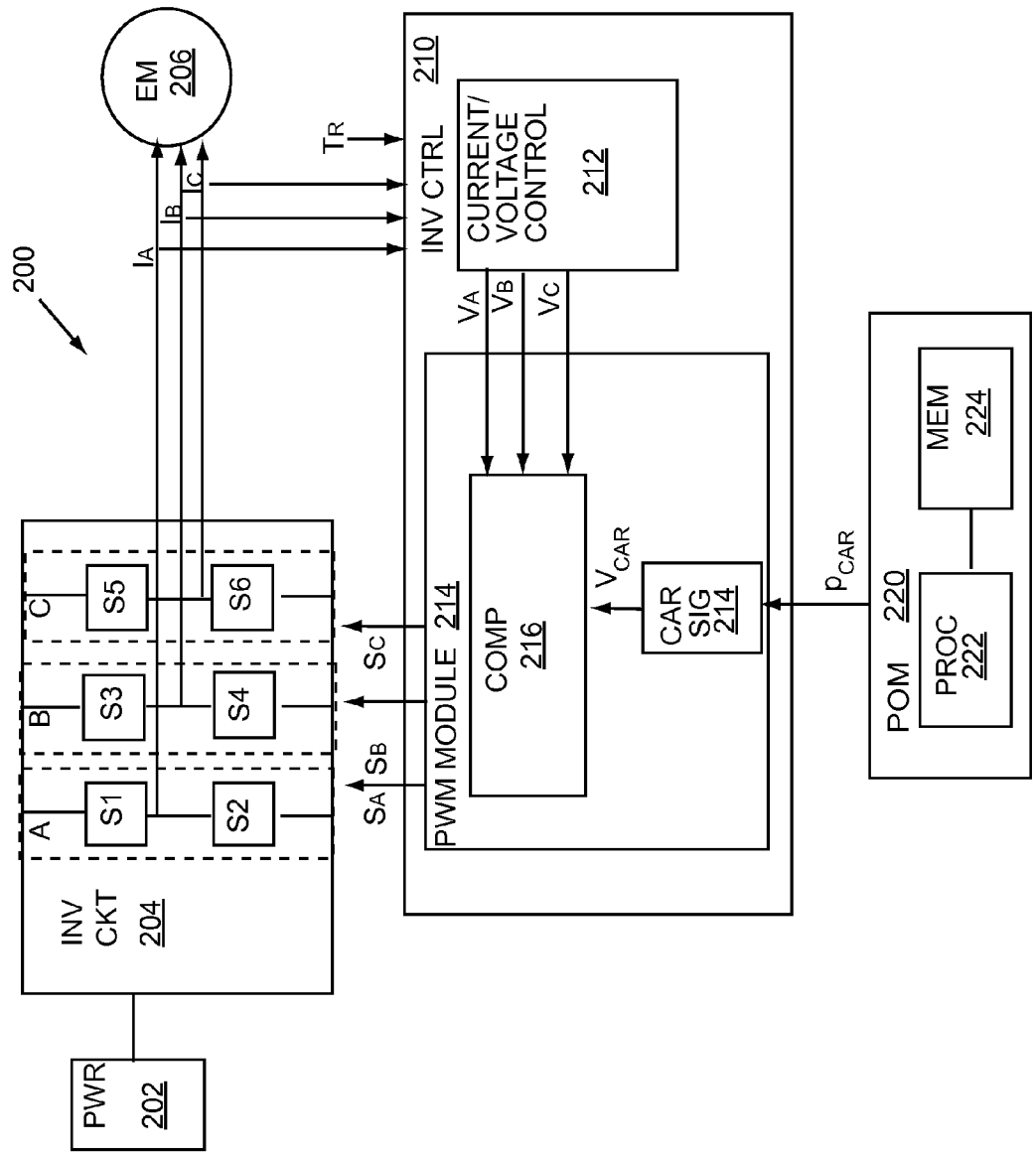
FIG. 2 shows an example system.

FIG. 2 depicts an example system 200 having an inverter circuit 204 configured for control by an inverter control 210 coupled to a POM 220. The inverter circuit 204 can be coupled to a power source 202 and comprise circuitry to provide three phase currents $I_A$, $I_B$, $I_C$ to a three-phase synchronous electric machine 206. In an example embodiment, the inverter circuit 304 can include phase legs A, B, and C, configured with switches S1, S2, S3, S4, S5, S6 respectively, that are configured to provide the currents $I_A$, $I_B$, $I_C$. The inverter control 210 can include a current/voltage control module 212, configured to provide required electric machine 206 stator winding voltages $V_A$, $V_B$, $V_C$ based on electric machine 206 torque requirement $T_R$. The inverter control 210 can also include a PWM signal module 214 for producing PWM drive signals $S_A$, $S_B$, $S_C$ for the inverter circuit 204 based on the phase voltages $V_A$, $V_B$, $V_C$. By way of example, but not limitation, the drive signals $S_A$, $S_B$, $S_C$ can be in the form of voltage levels and duty cycles applied to the gates of the various switches of the inverter circuit phase legs A, B, and C. In an example embodiment, the PWM signal module 214 can include a carrier signal module 214 and a comparator module 216. The carrier signal module 214 can be configured to provide a carrier signal $V_{CAR}$, which can provide PWM switching frequency. By way of example the carrier signal module 214 can comprise a high frequency signal generator. In an example embodiment, the carrier signal module 214 can be configured to produce a triangle wave carrier signal. The comparator module 216 can be configured to compare the carrier signal $V_{CAR}$ to the voltage signals $V_A$, $V_B$, $V_C$ to provide the drive signals $S_A$, $S_B$, $S_C$.

The POM 220 can be coupled to the PWM module 214 and configured to implement a strategy to reduce audible noise in an optimized manner. The POM 220 can be configured to designate a carrier period for the carrier signal generated at the module 214. The example POM 220 can include a processor module 222 and a memory 224, such as a ROM, configured to store an optimized PPP adapted to spread noise energy associated with electric machine 206 and inverter circuit 204 operation. In an example embodiment the processor module 222 can comprise a micro-computing device configured to step through a PPP sequentially to select a carrier period. The processor module 222 can be configured to provide the selected period to the PWM module 214. Although shown as a separate module for teaching purposes, it is contemplated that the POM 220 can be incorporated into the PWM module 214, and a single microcomputing device can be configured to determine carrier period using an optimized PPP stored at a memory or programmed at the microcomputing device and configure a PWM signal based on the required phase voltages $V_A$, $V_B$, $V_C$. A PPP can be repeated when its sequence is completed.

Figure 3:
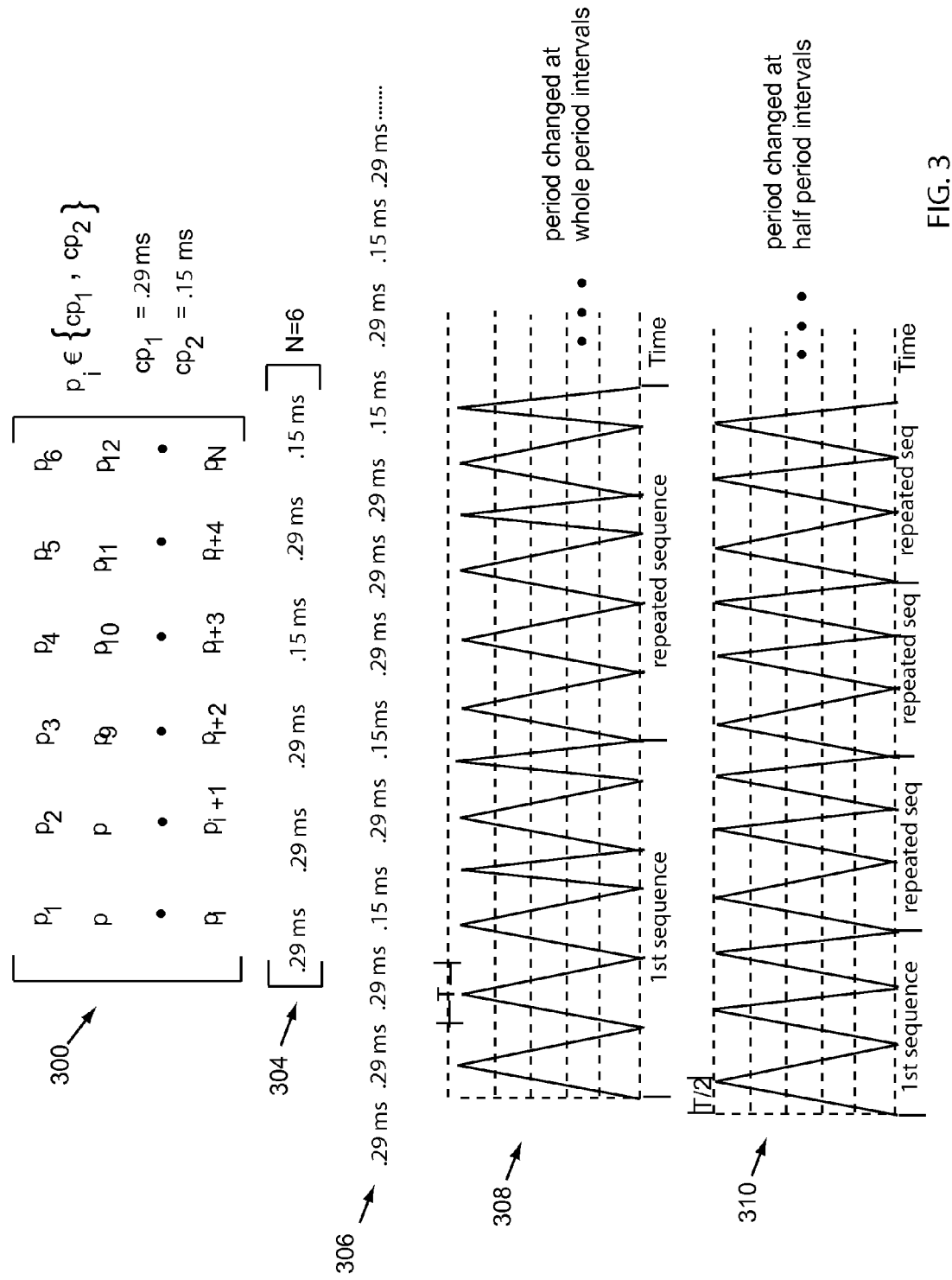
FIG. 3 shows an example pseudorandom period pattern.

FIG. 3 shows an example PPP expressed as an array 300 of N elements, $p_1$, $p_2$, $p_3$, $p_4$, $p_5$, $p_6$, $p_N$, ordered sequentially by index i up to the last element $p_N$, each element $p_i$ representing a carrier period having a value of 0.29 ms or 0.15 ms. By way of illustration, pattern 304 comprises a pseudorandom array having only six elements. The series 306 comprises a first pattern 304 sequence followed by repetition of the pattern 304. A graph 308 depicts a series comprising the repetition of the pattern 304 in the time domain when a new carrier period is applied at the end of each current period. The pattern 304 appears as a sequence of 6 triangles that is repeated when the end of the sequence is reached. In an exemplary embodiment, a new carrier period can be applied at half period intervals so that the pattern 304 appears as a series of symmetric and asymmetric triangles that can be repeated, as shown by graph 310.

Figure 4:
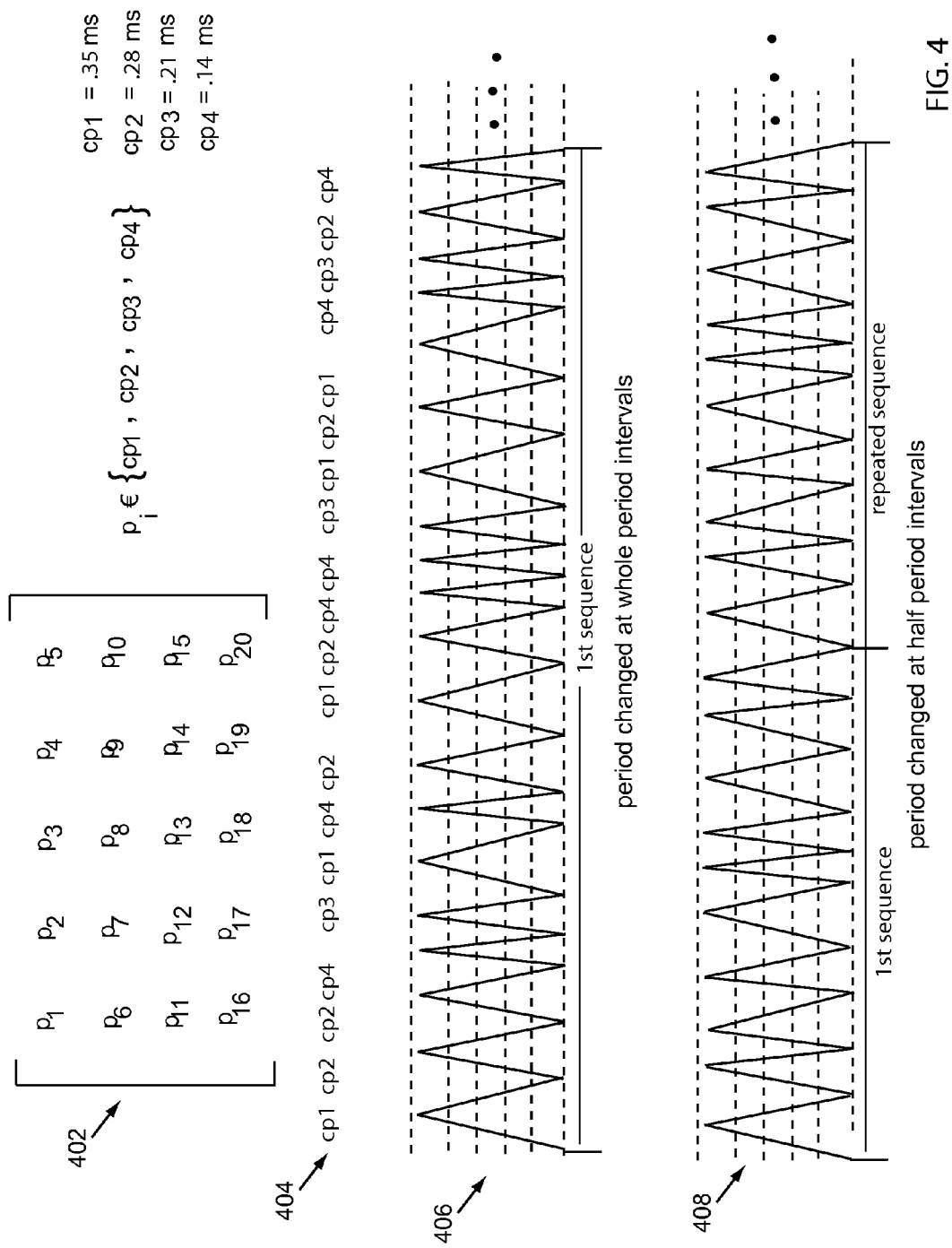
FIG. 4 shows an example pseudorandom period pattern.

FIG. 4 shows an example pattern array 402 having 20 elements, each element being one of 4 carrier periods. The array 402 can provide the pattern sequence 404. Graph 406 shows the pattern 404 when carrier period is changed at single period intervals, providing a sequence of 20 symmetric triangles that can be repeated. Graph 408 shows the pattern 404 when carrier period is updated at half-period intervals, providing a sequence of 10 symmetric and asymmetric triangles that can be repeated. For an array of 200 elements, the pattern can appear as a series of 200 triangles that is repeated when carrier period is updated at single period intervals, or 400 triangles when carrier period is changed at double period intervals.

The PWM noise reduction strategy of the present invention differs from prior art frequency spreading PWM strategies in several ways, including, but not limited to its pseudorandom, rather than random character. A PPP has a predetermined order of elements, a predetermined length or number of elements, and a finite number of possible values for each element, all of which can be selected through modeling techniques to optimally reduce the audible noise created by the electric machine drive. A PPP can be repeated, unlike a random hopping strategy in which each frequency (or carrier period) is selected at random and is independent of previous selections. In a preferred embodiment, each element of an PPP belongs to a set of two or more carrier periods (cp), as shown by Equation 1 below:

$$p_i \in \{cp_1, cp_2, cp_3, \ldots cp_m\} 2 \leq m \leq M \quad (1)$$

Figure 5:
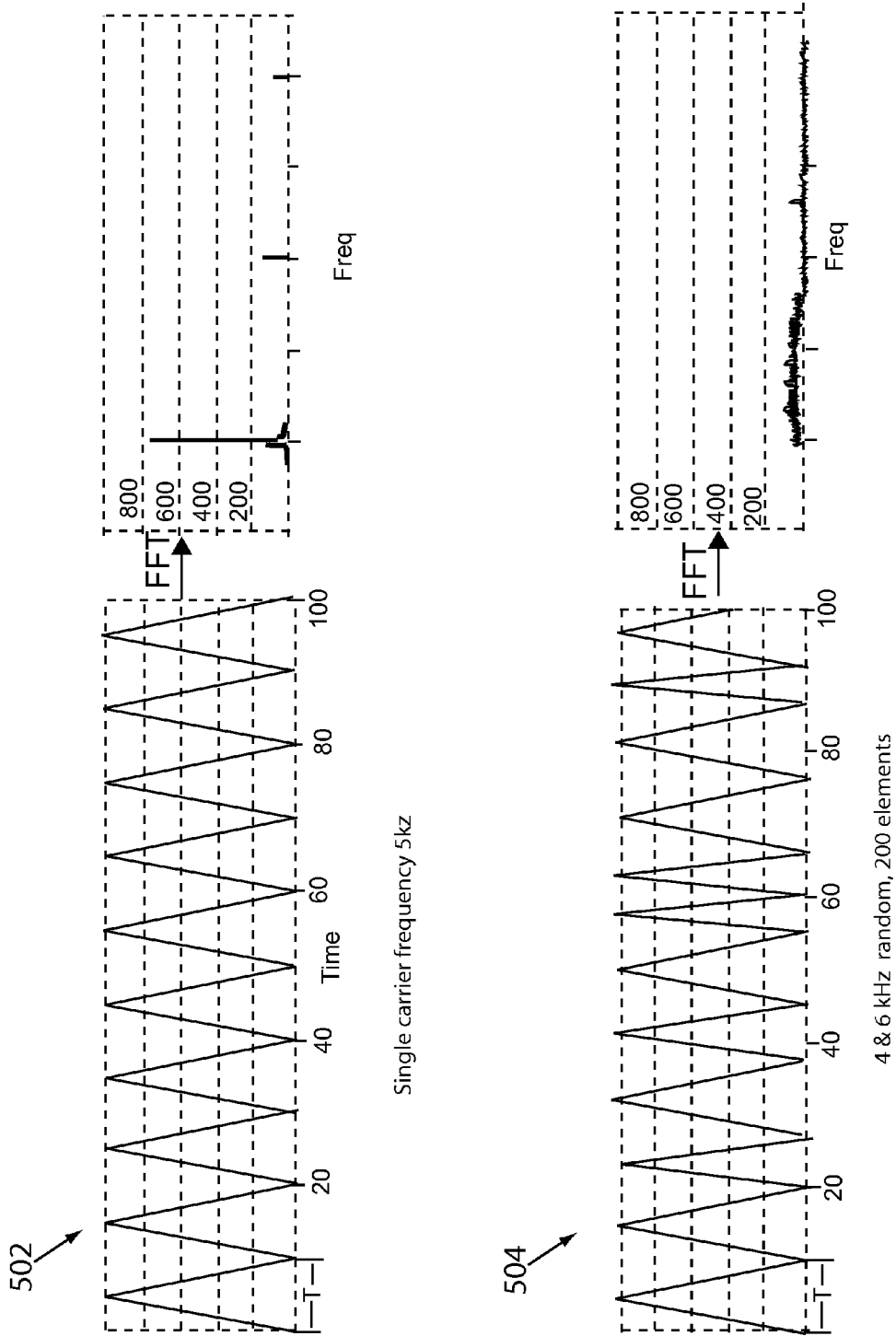
FIG. 5 shows a comparison of example invention noise spectra with traditional signal noise spectra.

The finite number of possible carrier periods that can be used in the pattern, the order in which the possible carrier periods are used, and the total number of elements in the pattern can be optimized to re-distribute the amount of noise energy in the audible spectrum. Modeling techniques can be used to evaluate the noise reduction and efficiency of various patterns. It has been found that a PPP having a length between 200 and 400 elements, with each element being one of 2 to 5 possible periods, effectively and efficiently spreads noise energy to reduce audible sounds heard by operators, passengers, or nearby pedestrians. The PPP can be optimized to both reduce noise and mitigate power losses. A further advantage of the invention is that the use of multiple carrier periods can move noise energy to frequency ranges to which human hearing is less sensitive, so that the entire system, e.g. electric machine, vehicle, etc. has less acoustic response. In an example embodiment, the set of possible periods includes those associated with frequencies above and below 5 kHz. In FIG. 5 the noise energy distribution when a single carrier frequency of 5 kHz is used, is compared to the noise energy distribution when a PPP having more than one carrier frequency is used. One way to quantify noise is by noise index; with a lower noise index preferable to a higher noise index. As shown in FIG. 5, PWM signaling using a single carrier frequency of 5 kHz produces a noise index of over 600. Using a PPP of this invention, the noise index can be reduced to below 100.

Figure 6:
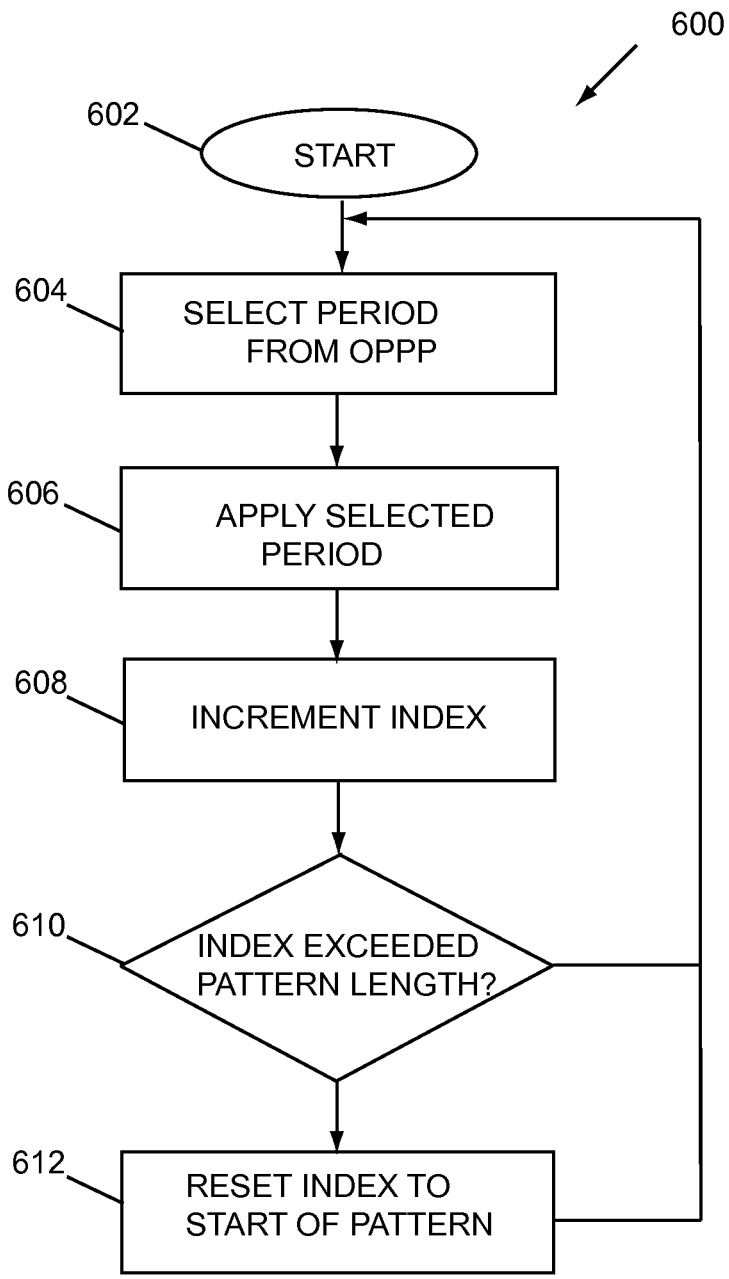
FIG. 6 shows an example method.

FIG. 6 shows an example method 600 for reducing audible EDS noise. The method can begin at 602. At block 604 a carrier period can be selected from an optimized PPP. For example, an optimized PPP stored at the memory 224 of the POM module 220 can be accessed by index i by a microcomputing device at the processor module 222. Referring to the array 304, for i=1, a period of 0.29 ms. can be selected.

At block 606, the selected period can be applied. For example, the 0.29 ms period (or 3.4 kHz frequency) can be provided by the processor module 222 to the carrier signal module 214. A signal generator at the module 214 can generate a carrier signal at 3.4 kHz. The carrier signal can then be compared with voltage $V_A$ to provide a PWM drive signal, $S_A$, for example, for the inverter circuit 204. In an exemplary embodiment, a new frequency (or carrier period) is applied at half period intervals, so that a subsequent current period is applied prior to completion of the present or current carrier period. However, other update intervals can also be employed, for example single period intervals, double period intervals, etc. Thus, in an example embodiment, a new period can be applied at or after completion of a full current period. At block 608, the index can be incremented by one. For example, i can be changed from 1 to 2. At decision block 610, a determination can be made as to whether the incremented index is greater than the length of the pattern sequence. For example, if a pattern has 200 elements, the incremented index can be compared to 200. For the array 304, the incremented index can be compared to 6. If the incremented index surpasses the pattern length, then at block 612, the index i can be reset to 1 so that the pattern can be repeated.

The invention provides apparatus and methods for implementing a PWM strategy for reducing audible noise associated with electric machine operation, while mitigating power losses. An optimized pseudorandom period pattern can spread carrier and sideband noise energy in the frequency spectrum to reduce or eliminate the whining noises that can result from PWM switching of an inverter circuit that supplies power to an electric machine. By way of example, but not limitation, a pseudo-random period pattern can be expressed as an array having 200-400 elements, with each element being one of 2 to 5 periods that can be used as a carrier period for PWM drive signals. Changing carrier period in accordance with the optimized pattern can substantially reduce the noise index associated with a signal. Using frequencies above and below 5 kHz has shown to be very effective and efficient in reducing audible noise.

The invention claimed is:

1. A system, comprising:
a pulse width modulation (PWM) optimization module (POM) configured to optimally spread energy to reduce humanly audible noise generated at an electrified vehicle (EV) electric drive system (EDS), said POM comprising a pseudorandom period pattern (PPP) comprising a sequence of carrier signal periods, said sequence configured to reduce said audible noise and mitigate power loss;
a signal generator configured to provide a carrier signal having said POM-designated carrier period, said carrier signal compared to a PMSM phase voltage to provide a PWM drive signal; and
an inverter circuit configured to receive said PWM drive signal comprising said POM-designated carrier period, said inverter circuit configured to provide power to a permanent magnet synchronous machine (PMSM) of said EDS.

2. The system of claim 1, wherein a subsequent sequential carrier period is applied in accordance with a pseudorandom period pattern (PPP) at or after completion of a present carrier period.

3. The system of claim 2, wherein said subsequent sequential carrier period is applied at completion of an interval comprising at least two complete said present carrier periods.

4. The system of claim 1, wherein a subsequent carrier period is applied in accordance with a pseudorandom period pattern (PPP) prior to completion of a present carrier period.

5. The system of claim 4, wherein said subsequent carrier period is applied at a midpoint of said present carrier period.

6. A pulse width modulation (PWM) optimization module (POM) configured to spread energy to reduce acoustic response associated with an electrified vehicle (EV) electric drive system (EDS), said POM comprising a pseudorandom period pattern (PPP) wherein said POM is configured to provide a period in accordance with said PPP for a carrier signal used to provide a PWM drive signal for an inverter of said EDS, said inverter configured to provide power for an electric machine of said EDS;
wherein said PPP comprises a finite array of elements and is configured to mitigate power loss; and
wherein said POM is configured to provide said carrier period to a signal generator configured to provide a carrier signal configured for comparison with a phase voltage for said electric machine to provide said PWM drive signal.

7. The POM of claim 6, wherein said PPP comprises at least 200 elements.

8. The POM of claim 6, wherein each element of said PPP belongs to a finite set of two or more predetermined periods.

9. The POM of claim 8, wherein said set comprises no more than 5 said predetermined periods.

10. The POM of claim 8, wherein said set comprises at least one period greater than 0.13 ms.

11. The POM of claim 8, wherein said set comprises at least one period greater than 0.2 ms and at least one period less than 0.2 ms.

12. The POM of claim 6, comprising a computer-readable medium having stored thereon said PPP and a sequence of instructions that, when executed by a digital processor, causes said digital processor to select said carrier period in accordance with said PPP.

13. The POM of claim 6, wherein said PPP comprises a repeatable predetermined order of elements, a predetermined number of said elements, and a finite number of possible values for each of said elements.

* * * * *